United States Patent [19]

Youlu et al.

[11] Patent Number: 4,749,752

[45] Date of Patent: Jun. 7, 1988

[54] FLUOROPOLYMER ALLOYS

[75] Inventors: Duan Youlu; Jin Shanrong; Huang Tingchun; Sun Jin; Yu Xinying, all of Shanghai, China

[73] Assignee: Shanghai Institute of Organic Chemistry Academia Sinica, Shanghai, China

[21] Appl. No.: 843,089

[22] Filed: Mar. 24, 1986

[30] Foreign Application Priority Data

Apr. 1, 1985 [CN] China .................................. 85100490
Apr. 1, 1985 [CN] China .................................. 85100491

[51] Int. Cl.$^4$ .................. C08L 27/18; C08L 27/20; C08L 69/00; C08L 81/04
[52] U.S. Cl. .................................. 525/199; 525/146; 525/150; 525/151; 525/185; 525/189; 524/406; 524/439; 524/508; 524/513; 524/520
[58] Field of Search ............... 525/199, 331.7, 146, 525/150, 151, 185

[56] References Cited

U.S. PATENT DOCUMENTS

| | | | |
|---|---|---|---|
| 3,769,252 | 10/1973 | Fujii et al. | 525/199 |
| 3,904,575 | 9/1975 | Satakawa et al. | 525/199 |
| 4,108,605 | 8/1978 | Billings. | |
| 4,444,727 | 4/1984 | Yanagihara. | |
| 4,552,925 | 11/1985 | Nakagawa et al. | 525/199 |
| 4,605,695 | 8/1986 | Sakamaki et al. | 525/199 |
| 4,624,990 | 11/1986 | Lunk et al. | 525/199 |

FOREIGN PATENT DOCUMENTS

| | | |
|---|---|---|
| 106764A | 4/1984 | European Pat. Off.. |
| 56-116742 | 9/1981 | Japan. |
| 935706 | 9/1963 | United Kingdom. |

*Primary Examiner*—Carman J. Seccuro
*Attorney, Agent, or Firm*—Ladas & Parry

[57] ABSTRACT

Fluoropolymer alloys made of melt fabricatable extra-high-molecular weight fluorinated ethylene-propylene copolymer (EHMW-FEP) and one or more other polymers. In fluoropolymer alloys made of EHMW-FEP and polytetrafluoroethylene, the weight percentage of the former is 0.1–99.9% and the latter is 99.9–0.1% respectively. The processes for preparing the fluoropolymer alloys are dried powder co-mill or wetted powder co-mill. Using the fluoropolymer alloys of this invention various kinds of articles have been fabricated by melt compression or cold compaction and sintering. These articles show a great improvement in creep property and also a prolonged service life in comparison with those made from ordinary polytetrafluoroethylene.

15 Claims, No Drawings

FLUOROPOLYMER ALLOYS

This invention relates to fluoropolymer alloys made of melt fabricatable extra-high-molecular weight fluorinated ethylene-propylene copolymer (EHMW-FEP) and one or more other polymers, their preparation and application.

The fluoropolymer alloys are new materials having properties different from the original polymers of which they are made. The fluoropolymers provide an important way to prepare new materials with a great variety of properties, because it permits using available polymers, in a simple process. They have attracted interest recently in Sato Kawa, plastics (Japan), 32, 69 (1981). The fluoropolymer alloys which have been reported are limited to blending polymers based on polyvinylidene fluoride, polytetrafluoroethylene (PTFE) dispersions and fluorinated ethylene-propylene copolymer (FEP) dispersions (B.P. 935, 706, (1960); Japanese patent kokai No. 12521/62.

Polytetrafluoroethylene, known as the "King of plastics", has excellent comprehensive properties. It has excellent thermal and chemical stability, and outstanding electrical insulation and anti-stick properties. But it cannot be fabricated by melt processing; it can only be fabricated by cold compaction and then sintering. Furthermore its creep-resistance is low. Therefore, its applications are limited.

A fluorinated ethylene-propylene copolymer which has good creep-resistance is a copolymer of tetrafluoroethylene and hexafluoro-propylene, as it can be melt fabricated, due to the presence of trifluoromethyl in the copolymer chain. The chemical inertness and outstanding electrical insulating properties of the copolymer are similar to polytetrafluoroethylene, but its thermal stability is not as good as PTFE, as it can only withstand temperatures up to 200° C., and its cost is higher than that of PTFE.

The purpose of the present invention is to prepare a fluorine-containing material with better properties by blending PTFE and FEP, and obtaining a polymer alloy with excellent properties and which overcomes the drawbacks of the two original polymers.

Processes for preparing polymer alloys made of polytetrafluoroethylene and fluorinated ethylenepropylene copolymers are indicated in B.P. 935, 706 (1960) and Japanese patent kokai 12521/62. Such processes use co-precipitation of these two fluoropolymer dispersions. The processes are complicated and expensive. The mechanical properties of the fluoropolymer alloy are worse than that of PTFE and FEP. For example their tensile strength is much lower than that of the two original polymers and only 142–213 Kg/cm$^2$ at room temperature.

An important problem is properly matching the polytetrafluoroethylene with a fluorinated ethylene-propylene copolymer in order to get a good fluoropolymer alloy made of PTFE and FEP. These two raw fluoropolymers have different processing temperatures and different thermal stability. The temperature of melt compression molding of FEP is about 310° C., but the sintering temperature after cold compaction of PTFE is about 380° C. The decomposition rate of FEP is much higher than that of PTFE at 380° C. Particularly, when FEP resins having carboxyl end groups are prepared by copolymerization using persulfates as initiators, it must be heated at 380° C. in order to stabilize the end group. However, FEP resins become "bread ruck", after roasting, and cannot be blended with PTFE powder.

Another important problem resides in the blend process of preparing a polymer alloy made of PTFE and FEP. In general blending polymers can be carried out by the solution blend, melt blend or dispersion coprecipitate blend methods. As there is no solvent which works for PTFE and FEP, the process could not be carried out by solution blend. Melt blend is also not possible, because PTFE cannot be melt processed. Therefore, dispersion coprecipitating blend has been the way used in B.P. 935, 706 and Japanese patent kokai No. 12521/62, although the cost of the polymer alloy is high, as one must use expensive fluorine-containing emulsifiers in preparing the dispersion of PTFE and FEP. Besides, the process blend coprecipitating is rather complicated.

The present invention provides a fluoropolymer alloy made of extra-high-molecular weight fluorinated ethylene-propylene copolymer as its chief component. The EHMW-FEP is characterized by having its melt processing property matched with PTFE.

The present invention also provides a blend process of dried powder co-mill or wetted powder co-mill for preparing the fluoropolymer alloy.

The present invention also provides a fluoropolymer alloy which is characterized by having melt fabrication properties like FEP, and cold compression and sintering properties like PTFE, and having the excellent properties possessed by both PTFE and FEP.

The present invention also provides a series of fluoropolymer alloys made of EHMW-FEP as their chief component, and at least one other polymer (including fluorine-containing or common polymers).

According to the present invention, the EHMW-FEP is a molding powder which can be melt fabricated, with melt viscosity of $1 \times 10^6$ poises or more, a melt flow index less than 0.8 gram/10 min., 12 to 30% by weight of hexafluoropropylene, a weight-average molecular weight of $2 \times 10^5$ or more and a tensile strength of 270 Kg/cm$^2$ or more at room temperature.

The process for preparing extra-high-molecular weight fluorinated ethylene-propylene copolymers which can be melt fabricated involves a solution precipitating polymerization with liquid hexafluoropropylene as a solvent, including raising the concentration of monomers in the reaction area by increasing the amount of monomers in a autoclave and increasing the amount of tetrafluoroethylene in the initial monomer mixture of tetrafluoroethylene and hexafluoropropylene, and reducing the concentration of free radicals in the polymerization area and thus reducing the termination possibility of the copolymer chain by reducing the amount of initiator (diisopropyl peroxydicarbonate) used. All these conditions are advantageous to growing the copolymer chain and to preparing very high molecular weight copolymers. The polymerization conditions are as follows: (1) charging 0.2–0.5 gram/ml of a mixture of tetrafluoroethylene and hexafluoropropylene in a autoclave, (2) the weight ratio of tetrafluroethylene in the initial monomer mixture of tetrafluoroethylene and hexafluoropropylene is 11–50%, (3) the percentage of initiator diisopropyl peroxydicarbonate (IPP) is 0.001 to 0.05% equivalents based on monomers, (4) the weight ratio of water and monomer is 3/1 to 1/1; the polymerization temperature is 40°–80° C.; the polymerization pressure is 20–30 Kg/cm$^2$; and the polymerization time is 1–5 hours per batch.

According to the present invention, the PTFE used is a commercial resin, including resins prepared by suspension or dispersion polymerization, and have tensile strength of greater than 270 Kg/cm$^2$ at room temperature.

According to the present invention, the other commercial polymers, such as polychlorotrifluoroethylene, polyvinylidene fluoride, tetrafluoroethyle-ethylene copolymer, polyethylene, polypropylene, polysulfone, polyimide, polycarbonate, polyphenylene oxide, poly(-phenylene sulfide) et al, can be used to prepare fluoropolymer alloys together with extra-high-molecular weight fluorinated ethylene-propylene copolymers.

A given weight ratio of EHMW-FEP and one or more other polymers as described above, were ground by mill, separately, and then mixed and ground again until the two or more phases were thoroughly mixed. The mixture passes through a 40-80 mesh and ready for processing.

The mixing and grinding process of two or more polymers may be carried out either in dried powder or wet powder form. During wet powder mixing and grinding, the polymers are moistened by water, ethyl alcohol, ethyl acetate or a mixture of these solvents. When the mixing is finished, the mixture of polymers must be dried, and then screened.

In the fluoropolymer alloy made of EHMW-FEP and PTFE, the weight of EHMW-FEP is 0.1-99.9% and the weight of PTFE is 99.9-0.1%. In a preferred embodiment the alloys contain 0.1-60% of EHMW-FEP and 40-99.9% of PTFE.

The fluoropolymer alloys made of EHMW-FEP and PTFE can be melt pressed into articles at temperatures of 300°-350° C. and pressures of 50-200 Kg/cm$^2$, like FEP. They can also be cold compressed at a pressure of 50-200 Kg/cm$^2$ and then sintered at a temperature of 300°-390° C., like PTFE.

The temperatures of melt pressing or sintering of the fluoropolymer alloys described above depend on their PTFE content. The higher the amount of PTFE, the higher the processing temperature.

The fluoropolymer alloys made of EHMW-FEP and PTFE of the present invention not only have a creep-resistance like FEP, but also high tensile strength under high temperature like PTFE. They exhibit tensile strength of 200-400 Kg/cm$^2$ and elongation of 300-700% at room temperature, and correspondingly 50-200 Kg/cm$^2$ and 300-700% at 200° C. The extra-high-molecular weight fluorinated ethylene-propylene copolymers is compatible with polytetrafluoroethylene in the fluoropolymer alloys described above. Fluoropolymer alloys made of e.g., 10% of EHMW-FEP and 90% of PTFE, have just about only one melting peak and one peak of crystallizing in its DSC spectrum.

All kinds of fluoropolymer alloys described above can be reinforced and improved by adding glass fibers, graphite, molybdenum disulfide, carbon and various metal powders.

The fluoropolymer alloys made of EHMW-FEP and PTFE of the present invention have excellent thermal stability, chemical inertness and outstanding electrical insulating properties. Using this kind of fluoropolymer alloy material, various diaphragm, seals, lining valves, lining pipes, lining pump, various components of pump, such as shell, wheel, wind wrap wire etc. can be fabricated. The articles made of fluoropolymer alloys have better creep-resistance than that of PTFE and consequently have a rather long operating life.

The fluoropolymer alloys described above can be used in power coating by either the electrostatic or flow-bed method, and can also be fabricated into complex articles using ram-extruding a paste consisting of fluoropolymer alloy and petroleum ether or kerosene.

The invention is more specifically described and explained by means of the following examples which, however, are not intended to be limiting. In the examples all parts and percentages are by weight except as otherwise noted.

EXAMPLE 1

20 Grams of EHMW-FEP with a melt flow index of 0 gram/10 min., and 180 grams PTFE have successively been moistened by a mixture of ethyl alcohol and ethyl acetate, milled, filtered, dried and passed through a 40 mesh screen. The resulting powder is cold compressed into a 2 mm thick sheet under pressure of 80 Kg/cm$^2$, and sintered in a oven for 1 hour at 350° C. After cooling, its tensile strength is 277 Kg/cm$^2$ under room temperature.

EXAMPLE 2

EHMW-FEP is mixed with PTFE in the weight ratio of 1/9, 1/3, 1/1, 3/1 and 9/1 respectively. The resulting mixtures are milled to pass through a 40 mesh screen, cold compressed under 80 Kg/cm$^2$ and sintered separately. The properties of the resulting fluoropolymer alloys are shown in Table 1.

TABLE 1

| Physical properties of alloys made of EHMW-FEP/PTFE | | | | | | | |
|---|---|---|---|---|---|---|---|
| Composition (EHMW-FEP/PTFE) | 1/0 | 9/1 | 3/1 | 1/1 | 1/3 | 1/9 | 0/1 |
| sintering temp. (°C.) | 300 | 300 | 300 | 320 | 340-365 | 340-365 | 365 |
| room tensile strength temp. (Kg/cm$^2$) | 265 | 210 | 250 | 290 | 260 | 280 | 320 |
| elongation (%) | 330 | 310 | 370 | 500 | 520 | 520 | 650 |
| 200° C. tensile strength (Kg/cm$^2$) | 46 | 87 | 84 | 82 | 89 | 104 | 89 |
| elongation (%) | 340 | 340 | 500 | 450 | 500 | 680 | 480 |

EXAMPLE 3

EHMW-FEP is mixed with tetrafluoroethylene-ethylene copolymer (F40) in weight ratio shown in Table 2 by blending dried powder or wetted powder. The resulting fluoropolymer alloys are fabricated by cold compression at a pressure of 70-150 Kg/cm$^2$ and then sintered or melt pressed.

TABLE 2

| Physical properties of alloys made of EHMW-FEP and F40 | | | | | | | | | |
|---|---|---|---|---|---|---|---|---|---|
| Composition (EHMW-FEP/F40) | 1/0 | 99/1 | 9/1 | 3/1 | 1/1 | 1/3 | 1/9 | 1/99 | 0/1 |
| fabrication temp. (°C) | 310–380 | 300–350 | 300–340 | 300–330 | 300–300 | 300–320 | 300–320 | 280–330 | 280–340 |
| tensile strength (Kg/cm$^2$) | 300 | 310 | 315 | 320 | 325 | 330 | 340 | 350 | 400 |
| elongation (%) | 300 | 300 | 280 | 260 | 200 | 150 | 100 | 100 | 100 |

EXAMPLE 4

A mixture of 40 grams of EHMW-FEP, 40 grams of PTFE and 10 grams of polysulfone, is moistened with acetone, mixed homogeneously by high speed stirring, milled, dried, 40 mesh screened, cold compressed under 80 Kg/cm$^2$ and then sintered for one hour at 320° C. The hardness (Rockwell) of the fluoropolymer alloy obtained is D50.

EXAMPLE 5

EHMW-FEP is mixed with polychlorotrifluoroethylene (CTFE) in the weight ratio shown in Table 3 by blending dried powder or wetted powder, the resulting fluoropolymer alloys are fabricated by cold compression at a pressure of 70–150 Kg/cm$^2$ and then sintering, or by melt pressing.

TABLE 3

| Physical properties of alloys made of EHMW-FEP and CTFE | | | | | | | | | |
|---|---|---|---|---|---|---|---|---|---|
| Composition (EHMW-FEP/CTFE) | 1/0 | 99/1 | 9/1 | 3/1 | 1/1 | 1/3 | 1/9 | 1/99 | 0/1 |
| fabrication temp. (°C) | 310–380 | 310–330 | 300–330 | 270–300 | 250–300 | 250–300 | 250–300 | 250–300 | 250–320 |
| tensile strength (kg/cm$^2$) | 300 | 280 | 200 | 220 | 300 | 305 | 320 | 300 | 350 |
| elongation (%) | 350 | 300 | 40 | 100 | 250 | 180 | 200 | 150 | 150 |

EXAMPLE 6

EHMW-FEP is mixed with polyvinylidene fluoride (PVDF) in weight ratios shown in Table 4 by blending dried powder or wetted powder (using diisobutyl acetone as a moistener). The resulting fluoropolymer alloys are fabricated by cold compression at a pressure of 70–150 Kg/cm$^2$ and then sintering, or by melt pressing.

TABLE 4

| Physical properties of alloys made of EHMW-FEP and PVDF | | | | | | | | | |
|---|---|---|---|---|---|---|---|---|---|
| Composition (EHMW-FEP/PVDF) | 1/0 | 99/1 | 9/1 | 3/1 | 1/1 | 1/3 | 1/9 | 1/99 | 0/1 |
| fabrication temp. (°C) | 310–380 | 280–320 | 280–330 | 280–330 | 250–330 | 240–300 | 220–250 | 200–250 | 200–250 |
| tensile strength (Kg/cm$^2$) | 310 | 330 | 350 | 300 | 300 | 350 | 400 | 450 | 500 |
| elongation (%) | 320 | 250 | 200 | 150 | 150 | 100 | 60 | 60 | 50 |

EXAMPLE 7

EHMW-FEP is mixed with polysulfone (PS) in the weight ratios shown in Table 5 by blending dried powder or wetted powder (including using chloroform as a solvent), the resulting fluoropolymer alloys are fabricated by melt compression under pressure of 70–150 Kg/cm$^2$.

TABLE 5

| Physical properties of alloys made of EHMW-FEP and PS | | | | | | | | | |
|---|---|---|---|---|---|---|---|---|---|
| Composition (EHMW-FEP/PS) | 1/0 | 99/1 | 9/1 | 3/1 | 1/1 | 1/3 | 1/9 | 1/99 | 0/1 |
| fabrication temp. (°C) | 310–380 | 280–320 | 250–310 | 220–300 | 250–290 | 250–290 | 270–280 | 200–270 | 200–280 |
| tensile strength (Kg/cm$^2$) | 300 | 270 | 250 | 220 | 200 | 250 | 360 | 700 | 800 |
| elongation (%) | 320 | 250 | 200 | 100 | 4 | 5 | 5 | 40 | 50 |

EXAMPLE 8

EHMW-FEP is mixed with polyethylene (PE) in the weight ratios shown in Table 6 by blending dried powder or wetted powder (using xylene as a solvent). The resulting fluoropolymer alloys are fabricated by melt compression at a pressure of 70–150 Kg/cm$^2$.

TABLE 6

| Physical properties of alloys made of EHMW-FEP and PE | | | | | | | | | |
|---|---|---|---|---|---|---|---|---|---|
| Composition (EHMW-FEP/PE) | 1/0 | 99/1 | 9/1 | 3/1 | 1/1 | 1/3 | 1/9 | 1/99 | 0/1 |
| fabrication temp. (°C.) | 310–380 | 280–350 | 250–300 | 200–300 | 170–250 | 150–200 | 160–170 | 150–170 | 150–200 |
| tensile strength (Kg/cm$^2$) | 300 | 280 | 250 | 180 | 100 | 150 | 190 | 200 | 200 |
| elongation % | 350 | 300 | 200 | 100 | 50 | 400 | 600 | 210 | 250 |

EXAMPLE 9

EHMW-FEP is mixed with polypropylene (pp) in the weight ratios shown in Table 7 by blending dried powder or wetted powder (using decalin as a solvent). The resulting fluoropolymer alloys are fabricated by melt compression under pressure of 70–150 Kg/cm$^2$.

TABLE 7

| Physical properties of alloys made of EHMW-FEP and PP | | | | | | | | | |
|---|---|---|---|---|---|---|---|---|---|
| Composition (EHMW-FEP/PP) | 1/0 | 99/1 | 9/1 | 3/1 | 1/1 | 1/3 | 1/9 | 1/99 | 0/1 |
| fabrication temp. (°C.) | 310–380 | 300–330 | 280–320 | 250–300 | 230–300 | 220–280 | 220–250 | 220–260 | 230–300 |
| tensile strength (Kg/cm$^2$) | 310 | 300 | 280 | 200 | 180 | 200 | 240 | 310 | 350 |
| elongation (%) | 340 | 300 | 350 | 200 | 300 | 350 | 500 | 250 | 200 |

EXAMPLE 10

EHMW-FEP is mixed with polycarbonate (PC) in the weight ratios shown in Table 8 by blending dried powder or wetted powder (using chloroform as a solvent). The resulting fluoropolymer alloys are fabricated by melt compression at a pressure of 70–150 Kg/cm$^2$.

TABLE 8

| Physical properties of alloys made of EHMW-FEP and PC | | | | | | | | | |
|---|---|---|---|---|---|---|---|---|---|
| Composition (EHMW-FEP/PC) | 1/0 | 99/1 | 9/1 | 3/1 | 1/1 | 1/3 | 1/9 | 1/99 | 0/1 |
| fabrication temp. (°C.) | 310–380 | 300–350 | 290–340 | 290–330 | 280–320 | 280–310 | 280–310 | 250–320 | 220–350 |
| tensile strength (Kg/cm$^2$) | 310 | 300 | 280 | 260 | 200 | 300 | 360 | 550 | 700 |
| elongation (%) | 350 | 300 | 200 | 100 | 50 | 10 | 5 | 80 | 100 |

EXAMPLE 11

EHMW-FEP is mixed with polyphenylene oxide (ppo) in the weight ratio shown in Table 9 by blending dried powder or wetted powder (using chloroform as a solvent). The resulting fluoropolymer alloys are fabricated by melt compression at a pressure of 70–150 Kg/cm$^2$.

TABLE 9

| Physical properties of alloys made of EHMW-FEP and PPO | | | | | | | | | |
|---|---|---|---|---|---|---|---|---|---|
| Composition (EHMW-FEP/PPO) | 1/0 | 99/1 | 9/1 | 3/1 | 1/1 | 1/3 | 1/9 | 1/99 | 0/1 |
| fabrication temp. (°C.) | 310–380 | 300–320 | 300–320 | 300–320 | 300–320 | 300–320 | 305–310 | 300–320 | 300–350 |
| tensile strength (K/cm$^2$) | 305 | 280 | 250 | 200 | 150 | 50 | 110 | 250 | 650 |
| elongation (%) | 330 | 250 | 200 | 100 | 10 | 4 | 5 | 40 | 50 |

EXAMPLE 12

EHMW-FEP is mixed with polyphenylene sulfide (PPS) in the weight ratios shown in Table 10 by blending dried or wetted powder. The resulting fluoropolymer alloys are fabricated by melt compression at a pressure of 70–150 Kg/cm$^2$.

TABLE 10

| Physical properties of alloys made of EHMW-FEP and PPS | | | | | | | | | |
|---|---|---|---|---|---|---|---|---|---|
| Composition (EHMW-FEP/PPS) | 1/0 | 99/1 | 9/1 | 3/1 | 1/1 | 1/3 | 1/9 | 1/99 | 0/1 |
| fabrication temp. (°C.) | 310–380 | 300–350 | 300–350 | 300–350 | 300–350 | 300–350 | 300–350 | 300–350 | 290–360 |
| tensile strength (Kg/cm$^2$) | 300 | 290 | 280 | 250 | 200 | 300 | 400 | 850 | 900 |

TABLE 10-continued

Physical properties of alloys made of EHMW-FEP and PPS

| Composition (EHMW-FEP/PPS) | 1/0 | 99/1 | 9/1 | 3/1 | 1/1 | 1/3 | 1/9 | 1/99 | 0/1 |
|---|---|---|---|---|---|---|---|---|---|
| elongation (%) | 320 | 300 | 250 | 200 | 100 | 50 | 5 | 15 | 10 |

EXAMPLE 13

EHMW-FEP is mixed with polyimide (PI) in the weight ratios shown in Table 11 by blending dried powder or wetted powder. The resulting fluoropolymer alloys are fabricated by melt compression at a pressure of 70–150 Kg/cm² or cold compaction under pressure of 70–150 Kg/cm² and sintering.

TABLE 11

Physical properties of alloys made of EHMW-FEP and PI

| Composition (EHMW-FEP-PI | 1/0 | 99/1 | 9/1 | 3/1 | 1/1 | 1/3 | 1/9 | 1/99 | 0/1 |
|---|---|---|---|---|---|---|---|---|---|
| fabrication temp. (°C.) | 310–380 | 300–320 | 300–320 | 300–320 | 300–320 | 300–320 | 310–320 | 250–300 | 150–300 |
| tensile strength (Kg/cm²) | 320 | 310 | 300 | 250 | 200 | 300 | 400 | 800 | 900 |
| elongation (%) | 330 | 300 | 280 | 250 | 100 | 80 | 50 | 10 | 5 |

EXAMPLE 14

10 Grams of EHMW-FEP are mixed with 90 grams of molding or dispersion powder of PTFE. The resulting mixture was milled, and 40 mesh screened. The resulting dried powder of fluoropolymer alloy are moistened with 200E gasoline, cold compressed and sintered. This fluoropolymer alloy product can be used for lining valves and pipes.

EXAMPLE 15

40 Grams of fluoropolymer alloy made of EHMW-FEP are mixed with PTFE with glass fiber in the weight percentage of 10%, 20% and 30% respectively. The resulting mixture is cold compressed under pressure of 80 Kg/cm² and sintered for 2 hours at 320° C. separately. The tensile strength of these reinforced fluoropolymer alloy is 250. 220 And 150 Kg/cm², respectively, at room temperature.

EXAMPLE 16

A fluoropolymer alloy made of 50 grams of EHMW-FEP and 50 grams of PTFE with glass fiber in a weight percentage of 20% and graphite in its weight percentage of 3, the resulting mixture is milled to pass through 40 mesh screen, cold compressed under pressure of 80 Kg/cm² and then sintered for 2 hours at 320° C. The tensile strength, elongation and hardness (Rockwell) of the reinforced fluoropolymers alloys are 150 Kg/cm², 220% and 58, respectively.

EXAMPLE 17

Process for preparing extra-high-molecular weight fluorinated ethylene-propylene copolymer, e.g. in a stainless-steel autoclave having a capacity of 130 liters are charged 60 liters of deionized water, 45 Kg of initial monomers containing 86.6% hexafluoropropylene. The contents are heated to 55°–57° C. at a pressure of 22.0 Kg/cm², then 25 ml of diisopropyl percarbonate are added. The copolymerization is carried on for three hours. 7.5 Kg of dried copolymer powder having a hexafluropylene weight ratio of 14.5%, a melt viscosity of $1.8 \times 10^6$ poises and a melt flow index of 0.3 g/10 min could been obtained. A sample of the copolymer powder is molded into sheet with a thickness of 2 mm at 310° C., which shows the tensile strength 290 Kg/cm² elongation 320%; and flex fatigue life more than $2 \times 10^5$ cycle under room temperature.

What we claim is:

1. Fluoropolymer alloys, which comprises the melt fabricatable extra-high-molecular weight fluorinated ethylene-propylene copolymer (EHMW-FEP) and one or more other polymers selected from the group consisting of polytetrafluoroethylene, polychlorotrifluoroethylene, polyvinylidene fluoride, tetrafluoroethylene-ethylene copolymer, polysulfone, polyethylene, polypropylene, polyimide, polycarbonate, polyphenylene oxide and polyphenylene sulfide, said (EHMW-FEP) being a copolymer of tetrafluoroethylene and about 12 to 30% by weight of hexafluoropropylene having a melt viscosity of more than $1 \times 10^6$ poises, and melt flow index of less than 0.8 gram/10 minute.

2. The fluoropolymer alloy as in claim 1, which comprises EHMW-FEP and polytetrafluoroethylene.

3. The fluoropolymer alloy, as in claim 2 wherein the weight percent of extra-high-molecular weight fluorinated ethylene-propylene co-polymer EHMW-FEP is 0.1–60, and the weight percent of polytetrafluoroethylene if 99.9–40%.

4. The fluoropolymer alloy as in claim 1, further comprising one of the group selected from glass fiber, graphite, molyldenum disulfide, carbon and metal powder.

5. The fluoropolymer alloy, as in claim 1 wherein the alloy has a tensile strength of 270 kg/cm² or greater at room temperature.

6. The fluoropolymer alloy as in claim 1 wherein the EHMW-FEP is prepared by solution precipitation polymerization using liquid hexafluoropropylene as a solvent, comprising charging 0.2–0.5 g of tetrafluoroethylene and hexafluoropropylene per 1 ml autoclave capacity into a autoclave, the monomer mixture of tetrafluoroethylene and hexafluoropropylene containing 11–50% by weight of tetrafluoroethylene, the weight ratio between water and monomers is 3:1 to 1:1, equivalents of initiator diisopropyl peroxy dicarbonate based on monomers being 0.001 to 0.05% at a polymerization pressure of 2–30 Kg/cm², polymerization temperature of 40° to 80° C. and polymerization time of 1–5 hours a batch.

7. A process for preparing fluropolymer alloys of melt fabricatable extra-high-molecular weight fluorinated ethylene-propylene copolymer (EHMW-FEP) and one or more other polymers selected from he group consisting of polytetrafluoroethylene, polychlorotrifluoroethylene, polyvinylidene fluoride, tetrafluoroethylene-ethylene copolymer, polysulfone, polyethylene, polypropylene, polyimide, polycarbonate, polyphenylene oxide and polyphenylene sulfide, said (EHMW-FEP) being a copolymer of tetrafluoroethylene and about 12 to 30% by weight of hexafluoropropylene having a melt viscosity of more than $1 \times 10^6$ poises, and melt low index of less than 0.8 gram/10 minute, comprising powder co-mill drying or wetted powder CO-milling.

8. The process as in claim 7 wherein the alloy is prepared by powder co-mill drying, mixing the polymers, milling the mixture again until homogenous, and passing through a 40 mesh screen.

9. The process as in claim 7 wherein the alloy is prepared by wetted powder co-milling comprising moistening the EHMW-FEP and one or more other polymer with one of the group consisting of water, ethyl alcohol, ethyl acetate or a mixed solvent thereof, milling, blending until homogeneous, filtering, drying and 40 mesh screening.

10. A fluoropolymer alloy as in claim 1 the alloy being capable of fabrication of one of the group consisting of melt compression, cold compaction and sintering, powder coating, powder coating of flow-bed, or ram-extruding of paste of dried powder and moistener.

11. The fluoropolymer alloy as in claim 10 fabricated by melt compression for at a temperature of 300°–350° C. and pressure of 50–200 Kg/cm$^2$.

12. The fluoropolymer alloy as in claim 1 fabricated by cold compaction and sintering at a cold compression pressure of 50–200 Kg/cm$^2$ and sintering temperature of 300°–390° C.

13. The fluoropolymer alloy as in claim 1 fabricated by ram-extruding paste of dried powder and moistener using petroleum ether or kerosene as a moistener.

14. The fluoropolymer alloy as claimed in claim 1 which may be fabricated into one of the group consisting of diaphrams, seals, lining valves, lining pipes, lining pumps, shell and wheel of corossive-resistance pump, wind-wrap wire.

15. The fluropolymer alloy as claimed in claim 1 wherein the EHMW-FEP has an average molecular weight of $2 \times 10^5$.

* * * * *